United States Patent Office 3,127,378
Patented Mar. 31, 1964

3,127,378
REACTION PRODUCTS OF CHLORSULFONIC ACID WITH ACRYLIC POLYMERS
Nicholas D. Cheronis, 5558 Ardmore Ave., Chicago 30, Ill.
No Drawing. Filed May 14, 1958, Ser. No. 735,137
3 Claims. (Cl. 260—79.3)

My invention relates to the preparation of new and useful reaction products of chlorsulfonic acid with acrylic polymers. The said reaction products possess oil-repellent properties and are adapted for a variety of uses, particularly for impregnating fibrous materials such as leather to which they impart oil-repellency and material reduction in stiffening even though used in contact with gasoline or lubricating oils or like materials.

In the practice of my invention, an acrylic monomer or mixture of monomers is polymerized, generally by mass polymerization techniques, through the utilization of heat and catalysts such as peroxides to produce a relatively low molecular weight intermediate polymer, which is normally liquid at room temperature, having an appreciable amount of residual unsaturation in the polymer molecule. In general, the polymerization of the acrylic monomer is carried out to an extent such as to produce an acrylic polymer having a relative viscosity in the range of 6 to 15 in relation to pure toluene and, more desirably, between 7 and 10.

The acrylic monomers which are useful in the practice of my invention can be selected from a large number which are, per se, well known in the art. These include, for instance, acrylic acid, methacrylic acid, ethyl acrylate, butyl methacrylate, n-propyl methacrylate, isopropyl methacrylate, isopropyl methacrylate, isobutyl methacrylate, hexyl methacrylate, ethylhexyl acrylate, nonyl methacrylate, and dodecyl methacrylate, methacrylonitrile, and mixtures of such monomers such as mixtures of methyl methacrylate monomer or butyl methacrylate monomer with acrylic acid or methacrylic acid.

The low molecular weight acrylic polymers are also, per se, known in the art. Thus, for instance, reference may be made to U.S. Patent No. 2,721,145 which discloses low molecular weight polyacrylates and polymethacrylates. Typical of such polymers are butyl polymethacrylates which can be represented by the following structural formula:

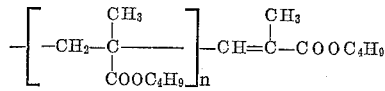

where $n$ is an integer from 4 to 40. Thus, if $n$ is 10, the residual unsaturation of said polymer is 3.5 times what it would be if $n$ is 35. In the particularly preferred embodiments of my invention, the acrylic monomers utilized correspond to the formula

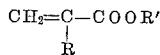

where R is hydrogen or methyl and R' is an alkyl radical containing from 1 to 12, and especially 1 to 4, carbon atoms.

As indicated above, the acrylic monomer is polymerized, generally by heating it at or near its boiling point, and adding a catalyst in small proportions, for example, 0.25 to 0.5% of a peroxide such as benzoyl peroxide, until the relative viscosity of the resulting acrylic polymer in relation to the viscosity of toluene is between 6 and 15. The extent of polymerization is determined by the viscosity of the acrylic polymer. It is important to the achievement of the best results of my invention that the extent of polymerization of the acrylic polymer fall within the aforementioned viscosity ranges prior to the production of the chlorsulfonic acid reaction products thereof.

After the polymerization of the acrylic monomer has proceeded to the extent indicated above, the said intermediate polymer is diluted with an inert solvent, advantageously with an approximately equal volume of carbon tetrachloride, and then chlorsulfonic acid ($ClSO_2OH$) is added thereto. The amount of chlorsulfonic acid, based on the weight of the acrylic polymer, which is employed is variable within reasonable limits. In general, the said amount of chlorsulfonic acid can be varied from 5% to 30%, better still from 8% to 20%, and especially from 12% to 16%. The reaction which takes place between the acrylic polymer and the chlorsulfonic acid is evidenced by a rise in temperature and an increase in the viscosity of the reaction mixture. No hydrogen chloride is evolved. The reaction mixture is permitted to stand for about 24 to 72 hours, after which most of the organic solvent is removed either under reduced pressure or by distillation at atmospheric pressure. For subsequent reaction with ammonia or amines, as hereafter described, a certain amount of organic solvent, generally from about 30% to 50% based on the weight of acrylic polymer, should be allowed to remain in the reaction mixture.

It may be noted, however, that on complete evaporation of the solvent a dark purple rubbery solid generally is obtained. The solid, rubbery material has excellent stretching properties, an acid pH, and qualitative tests show the presence of chlorine, sulfur and acidic groups. It is a chlorsulfonic acid reaction product of the acrylic polymer. In the illustrative case where the acrylic polymer is prepared from butyl methacrylate monomer, it would appear that the structure of the chlorsulfonic acid reaction product may perhaps be represented by a mixture of compounds in accordance with the following alternative formulae:

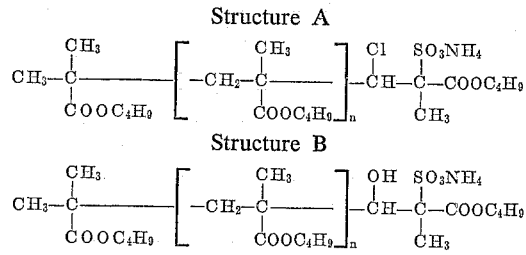

When the aforementioned acid-reacting chlorsulfonic acid reaction products of the acrylic polymers are neutralized by treatment with bases, such as ammonia or lower alkyl amines or alkali metal hydroxides, for example, sodium hydroxide, they tend to change color, generally from dark purple to creamy white, their stickiness or adhesiveness is diminished or lost, and a whitish rubbery solid forms which is usually soluble in an acetone-toluene mixture and when cast into a film exhibits high oil repellency.

In carrying out the neutralization step, an aqueous solution of the base is admixed with and stirred into the acid acrylic polymer-chlorsulfonic reaction product containing advantageously from 30 to 50% of inert organic solvent, based on the weight of said acid reaction product. As indicated above, heat is evolved and a rubbery mass slowly forms, which is commonly whitish in color, and which contains an appreciable amount of water, the amount of said water being dependent upon the amount and character of the inert organic solvent present. If, for instance, the inert organic solvent used in the reaction of the acrylic polymer with the chlorsulfonic acid were carbon tetrachloride and substantially equal volumes of said organic solvent and said acrylic polymer-chlorsulfonic reaction product were utilized, and if 30% of the total carbon tetrachloride were evaporated, then, upon the addition of aqueous ammonia to neutralize the acid reaction product, a creamy emulsion would result containing a high content of water. In the usual case, where 30% to 50% of the carbon tetrachloride is present when the aqueous alkali is added to effect neutralization, the rubbery mass which results contains a somewhat lesser amount of water, commonly in amounts of 40% to 80%. If the aforesaid creamy emulsion is added to boiling water, the carbon tetrachloride is given off and the creamy emulsion changes to a rubbery mass which still contains an appreciable amount of water, ordinarily in the range of 40% to 50%. It is particularly desirable to utilize ammonia to effect neutralization, but lower amines such as methylamine, dimethylamine, triethylamine, isopropylamine, diisopropylamine, monoethanolamine, diethanolamine, triethanolamine, pyridine, sodium hydroxide and potassium hydroxide can be employed. Where the products of the invention are to be used in environments where resilient films are a desideratum, it is particularly advantageous to use ammonia for the neutralization.

In the utilization of the neutralized acrylic polymer-chlorsulfonic acid reaction products produced in accordance with my invention, the said neutralized products, which are rubbery-like masses, are dissolved in an 80–20 mixture of toluene-acetone. The acetone is added first to said masses and, after shaking for a short time, addition of the toluene results in a milky homogeneous dispersion. The use of acetone or equivalent solvent is necessary since the chlorsulfonated acrylic polymer, as already noted, contains a considerable amount of water. Indeed, when the said polymer contains 60 to 80% water the dispersion on standing separates into two layers, the lower layer being water which is readily dispersed on shaking. It has been found that the presence of water aids in obtaining a uniform, well-adhering, non-tacky film on such fibrous materials as leather. The final solution, when brushed on leather, gives a flexible adhering film with remarkable oil-repellency properties. Addition of a film in amount of 3% to 4% of the weight of the leather reduces the oil absorption of said leather from 50% to 60%, which is the normal oil absorption of glove leathers, to about 1% to 4%.

For the purpose of imparting oil-repellency to continuous surfaces of fibrous materials such as leathers and textiles a solution containing several percent, for instance, 3% to 8%, usually a 5% solution, of the neutralized chlorsulfonated acrylic polymer is sprayed or brushed so as to form a thin coat, then the material so sprayed or brushed is heated for 0.5–3 hrs. at a temperature of 60–65 degrees C. so as to remove the solvent. A non-tacky resilient film results which is highly oil-repellent. In the case of glove leathers, chlorsulfonates of polymers of n-butyl methacrylate are especially useful because they provide a resilient film while at the same time furnishing excellent oil-repellency.

For the evaluation of oil-repellency of military glove leathers a test sample of 1.75 x 3.5 inches is weighed, then placed in a flexing machine with the grain side up. The wedges which hold the test specimen are adjusted in place and a definite volume of lubricating oil is placed in the trough formed by the test specimen. The specimen is flexed at the rate of 80 times per minute and the time at which the oil appears on the underside is noted as the dynamic oil penetration. After 30 minutes of flexing the specimen is removed and the grain side is weighed. The gain in weight divided by the initial weight of the leather gives the percent of oil absorption of the test specimen under flexing. In order to determine the effect of solvents on the protecting oil-repellent treatment, the same test specimen is extracted three times with gasoline for 30 minutes, then after drying for 24 hours at room temperature it is again tested for oil penetration and absorption. Finally, determination of flexibility of adjacent specimens gives information as to the relative stiffness produced by each treatment. Table 1 gives representative test data selected from about 67 different types of leather treatments to impart oil-repellency to glove leathers. The chlorsulfonated polymers were placed in the interstices or on the surface and then tested by the dynamic oil penetration and absorption method. Each value represents the average of at least 24 test specimens.

TABLE 1

*Summary of Dynamic Oil Repellency of Various Glove Leathers*

| Type of Leather | Treatment | Deposition | Initial Performance | | | Performance After Solvent Extraction | | |
|---|---|---|---|---|---|---|---|---|
| | | | Pen./min.[a] | Abs. Percent[b] | RSF/E[c] | Pen./min.[a] | Abs. Percent[b] | RSF/E[c] |
| Cowside | Noncommercial glove leathers. | none | 4 | 45 | 0.86 | 3 | 47 | 1.27 |
| Do | Commercial glove leather | none | 5 | 73 | 1.06 | 3 | 88 | 1.65 |
| Cowside (A) | Tanned with sulfonyl chloride and fat-liquored. | 0 | 9 | 52 | 0.51 | 5 | 57 | 0.74 |
| Same as (A) | Like (A) but brushed with chlorosulfonated butylpolymethacrylate solution to deposit 4% on grain. | 4 | 30 | 3.2 |  | 30 | 5.3 | 0 |
| Cowside Chrome-tanned Lg. Scale Production. | Brushed with chlorosulfonated butylpolymethacrylate to deposit 6%. | 6 | 30 | 2.1 | 1.4 | 30 | 4.6 | 2.1 |

[a] Penetration of oil in minutes; if the number 30 appears it indicates that there was no penetration in 30 minutes of flexing.
[b] Absorption of oil after 30 minutes of flexing.
[c] Relative stiffness factor determined by the Tinius-Olsen machine using Federal Specifications KK-L-311A.

Samples from two batches of ammonium chlorsulfonated butyl polymethacrylate (identified as samples 5644 and 5654) which were used in the large scale production of 200 feet of glove leather having high oil-repellency were subjected to careful analysis. Samples of the said polymer products were dehydrated first in a vacuum desiccator, then pulverized into granules and dried in an electrically heated oven at 60 degrees C. under reduced pressure (20 min.) over phosphorus pentoxide. Then they were analyzed for carbon, hydrogen, nitrogen, chlorine and sulfur.

Table 2 gives the analytical data obtained:

TABLE 2

| Polymer No. | Carbon, Percent | Hydrogen, Percent | Nitrogen, Percent | Chlorine, Percent | Sulfur, Percent |
|---|---|---|---|---|---|
| 5644 | 58.44 | 9.06 | 3.21 | 0.59 | 4.03 |
| 5645 | 58.20 | 9.00 | 2.86 | 0.50 | 3.58 |

In these two samples, the amount of chlorosulfonic acid used was 15% of the weight of the acrylic monomer. On the assumption that all of the chlorosulfonic acid added to the acrylic polymer and that none of the chlorine or sulfur was removed during the treatment with ammonia, the percent of sulfur would be 3.61 and of chlorine 3.98. The analytical data obtained indicate that a considerable amount of chlorine was removed during the neutralization reaction by hydrolysis. That this occurred was evidenced by the fact that chloride ions were found in the washings from the neutralization of the chlorosulfonated acrylic polymer. Further, in several runs the acid chlorosulfonated polymethacrylate was not treated with excess of ammonia and the neutralization step was shortened. The analysis of the products from such runs gave a chlorine content ranging from 1.25 to 1.91%. When such products were boiled with water the chlorine content diminished to about 0.4%. This indicated replacement of the chlorine by the hydroxyl group.

The alternative structures hypothecated for the chlorsulfonic acid reaction products, in the illustrative case where the acrylic polymer is prepared from n-butyl methacrylate monomer, have been set forth above. If, in one case the letter $n=4$ and in another case the letter $n=5$, then the following percentages of elements present are shown as calculated for each structure, together with the average found on actual analyses of such reaction products:

| Element | Calculated on the basis of Structure A | | Calculated on the basis of Structure B | | Average found on Analyses |
|---|---|---|---|---|---|
| | $n=4$, Percent | $n=5$, Percent | $n=4$, Percent | $n=5$, Percent | |
| Carbon | 60.4 | 58.8 | 60.8 | 59.88 | 58.37 |
| Hydrogen | 8.7 | 8.5 | 8.8 | 8.8 | 9.03 |
| Nitrogen | 1.2 | 1.4 | 1.2 | 1.4 | 3.03 |
| Sulfur | 2.9 | 3.3 | 2.9 | 3.3 | 3.8 |
| Chlorine | 3.1 | 3.6 | 0.0 | 0.0 | 0.54 |

From these figures, it may tentatively be assumed that the chlorosulfonated butyl polymethacrylate described in Example 1 below is a mixture of hexamers ($n=4$) and heptamers ($n=5$) of the structures A and B mentioned above. The higher content of nitrogen would appear to be due to the large amount of ammonia absorbed and held tenaciously by the polymer. When the chlorosulfonated butyl polymethacrylate is boiled in water it loses the absorbed ammonia, and the analyses for nitrogen drop to less than 1.0%. However, the film characteristics of such polymers are not as desirable for applications to leathers or textiles since their adherence is not as good as when excess of ammonia is present.

The following examples are illustrative of the practice of the teachings of my invention. It will be understood that various changes may be made within the scope of the guiding principles and teachings provided herein and that, therefore, the examples are not to be taken in any way as limitative of the full scope of the invention.

EXAMPLE 1

Commercial n-butyl methacrylate monomer was washed with 10% aqueous sodium hydroxide to remove the inhibitor, then twice with water, and dried over calcium chloride. 70 grams of the resulting dry butyl methacrylate was placed in a 3-necked round bottom flask provided with a reflux condenser and a thermometer reaching into the liquid. The flask was heated until the temperature of the liquid reached 155 degrees C. and then 0.175 gram of benzoyl chloride was added in small portions over a period of 10 minutes. The temperature rose first to 160 degrees, then to 170 degrees C. After all the peroxide was added the heating was continued for another 20 minutes and the temperature rose to 175 degrees. The heating was discontinued and the mixture was allowed to cool. 13 grams of the mixture was removed for viscosity measurements and other tests. The relative viscosity of the butyl methacrylate polymer compared to pure toluene was found to be 7.8.

The remaining 57 grams of butyl methacrylate polymer was diluted with 60 ml. of carbon tetrachloride, cooled to 0 degrees C., then treated with 7 grams of chlorsulfonic acid. The mixture was allowed to stand at room temperature for 24 hours. The viscosity of the mixture had increased. The flask was connected to a vacuum line and warmed until about 45 grams of the solvent was distilled off. A red brown rubbery mass remained. About 100 ml. of water and 30 ml. of concentrated ammonia was added and the mixture was stirred for 1 hour. The red brown mass changed to a white rubbery mass which adhered to the stirrer. The white rubber-like material was not sticky; it could be stretched and when squeezed it gave off water. The weight of the mass after draining off excess water was 190 grams. A sample weighed and dried in an oven at 105 degrees C. and then weighed again indicated that the white rubbery mass contained 67% water.

A sample of the rubbery mass was dissolved in an 80–20 toluene-acetone mixture, and diluted with said solvent to about 6% solids. Films were cast from this solution on glass slides of about 0.1 mm. thickness. Oil drops placed on these films gave a high degree of contact angle which remained unchanged for four days. (Films cast from the sample removed before chlorosulfonation gave a 67% lower oil repellency for the first 24 hours, and 150% lower after 3 days.) Films cast from the solution adhered tenaciously on solid surfaces, for instance, fibrous surfaces, particularly on leather and textiles, and did not crack when the fibrous material was flexed over 2000 times. The films were lustrous and non-tacky after the fibrous material on which the solution was applied was heated for about 20–30 minutes at 60 degrees C.

A small amount of the rubbery solid was dried first in a vacuum desiccator over $P_2O_5$, then broken into small granules. The solid material was subjected to qualitative tests for the presence of sulfur, chlorine and nitrogen. All were strongly positive. The dehydrated material when boiled with water did not hydrate readily but absorbed water slowly. When left in water over a period of 3 days it gained only 20% of water but did not acquire its former rubbery consistency.

EXAMPLE 2

200 grams of dry n-butyl methacrylate was polymerized as in the preceding example, using 0.5 gram benzoyl peroxide and 40 minutes for total time of polymerization. The relative viscosity of the intermediate polymer at the end of this period was found to be 8.9 (compared with pure toluene).

The mixture was cooled, diluted with 200 ml. carbon tetrachloride, and 30 grams of chlorosulfonic acid was added, then allowed to stand for 3 days. The viscous material was then added directly to a mixture of 100 ml. concentrated ammonium hydroxide and 1000 ml. water and stirred by a mechanical stirrer. A vigorous reaction ensued and a white fluid polymer separated out. The mixture was allowed to stand 3 hours, then heated over a steam bath to drive off most of the carbon tetrachloride, then cooled and repeatedly washed with water, by kneading and stirring. A rubbery mass was obtained which when drained of excess of water weighed 390 grams. Samples dried and tested for elements gave strongly positive tests for sulfur, chlorine and nitrogen. Samples dissolved in toluene-acetone and cast into films gave good oil-repellency.

EXAMPLE 3

A mixture of 70 grams of n-butyl methacrylate and 30 grams of styrene was polymerized with 0.25 gram of benzoyl peroxide, as described in Example 1, for 40 minutes. A sample withdrawn at the end of polymerization gave a relative viscosity of 8.4 compared with pure toluene.

The mixture was diluted with 100 ml. of carbon tetrachloride, cooled to 0 degrees C. and treated with 15 grams of chlorsulfonic acid very slowly. The mixture was allowed to stand for 24 hours. The viscosity had increased but it was noted that some hydrogen chloride was given off indicating some chlorosulfonation of the benzene nucleus in the styrene. The mixture was connected with an aspirator and slightly warmed until 100 grams of the solvent was removed, then 500 grams of water and 60 ml. of concentrated aqueous ammonia was added and the mixture stirred. A heavy white rubbery mass separated out. The mixture was allowed to stand for 24 hours, then the resulting rubbery mass was thoroughly washed. The said mass was a hard rubber-like material which could be cut with a knife and did not have good elastic properties. A sample dissolved in toluene-acetone and cast into films gave good oil-repellency. A sample dried and tested for elements gave strong tests for sulfur. The tests for chlorine and nitrogen were positive but not as strong as those of the material in Example 1.

EXAMPLE 4

A mixture of 60 grams of n-butyl methacrylate, 20 grams of lauryl methacrylate, 10 grams of methyl methacrylate and 10 grams of styrene was polymerized with 0.25 gram of benzoyl peroxide, as described in Example 1, for 40 minutes. The relative viscosity at the end of this period was 7 (compared with pure toluene).

The mixture was cooled, diluted with 100 ml. of carbon tetrachloride and cooled to 0 degrees C., then treated with 14 grams of chlorsulfonic acid and allowed to stand for 24 hours, then treated exactly as described in Example 3. The resulting polymer was very fluid and somewhat sticky. However, films cast from it on glass slides and heated at 60 degrees C. for 4 hours gave non-tacky films with fair oil-repellency, that is, the contact angles of oil drops on the film were somewhat lower than those obtained from films of the polymer described in Example 1.

EXAMPLE 5

500 grams of n-butyl methacrylate were polymerized with 1.4 grams of benzoyl peroxide as described in Example 1. The heating period was 40 minutes. The relative viscosity at the end of this period was 6.3. The polymer was divided into five portions, each representing 100 grams of the polymer and each portion was diluted with 100 ml. of carbon tetrachloride. Each portion was cooled to 0 degrees C. and treated with the following quantities of chlorsulfonic acid: Portion A with 15 grams; portion B with 15 grams; portion C with 30 grams; portion D with 15 grams and portion E with 8 grams. Each portion was allowed to stand for 24 hours, then treated as follows:

Portion A—most of the solvent was removed under vacuum. The product weighed 108 grams, was a sticky red purple rubbery material of acidic nature. The film, as judged from the rate of spreading of oil drops thereon, had about 50% of the oil-repellency of the product described in Example 1.

Portions B, C and E were treated with water and ammonia as described in Example 1, while portion D was treated with 500 ml. of water and 60 ml. of 24% sodium hydroxide solution.

The product from portion B weighed 315 grams, was a white rubbery mass similar to the product described in Example 1, and its films exhibited good oil-repellency. Dry samples gave positive tests for sulfur, chlorine and nitrogen.

The product from portion C weighed 275 grams. It was a stiff rubber without a great deal of elasticity. The films were not as resilient as those prepared from portion B but exhibited good oil-repellency. Tests for sulfur, chlorine and nitrogen strong and positive.

The product from portion D was sticky and more fluid, but on continuous stirring with water it lost most of its stickiness. The weight of the polymer after the water was drained was 275 grams. The films were not as strongly adherent to fibrous materials as those of portion B, and exhibited about 50% of their oil-repellency. The dry material gave strong tests for sulfur and sodium, but a weak test for chlorine.

The product from portion E was a white rubbery mass; when drained from water it weighed 250 grams. It had fair elasticity. Films cast from solutions of this polymer had resiliency but tended to be tacky unless heated for 3–4 hours at 60 degrees C. The oil-repellency, as measured by the rate of spreading of oil drops placed on films cast from solutions of the polymer, exhibited about 70% of the oil-repellency of those films resulting from portion B.

EXAMPLE 6

In a 5-liter 3-neck flask provided with a reflux condenser and a thermometer were placed 830 grams of commercial n-butyl methacrylate monomer which had been washed free from inhibitors by shaking three times with 10% sodium hydroxide and then twice with water and dried over calcium chloride. The flask was heated until the liquid started to boil when the heat was removed and 2.2 grams of benzoyl peroxide was added (dissolved in 10 ml. of xylene) over a period of 20 minutes. The mixture was then heated for another 20 minutes or a total time of polymerization of 40 minutes. The temperature of the mixture at the end was 180 degrees C. The relative viscosity compared to pure toluene of a small sample removed just before dilution was 9.2.

The reaction mixture was cooled to 60 degrees C. and then diluted with 900 ml. of dry carbon tetrachloride. The solution was cooled in an ice bath to 0 degrees C. and 126 grams of chlorsulfonic acid was added in small portions with shaking. After 64 hours the viscous solution in the flask was emptied into an evaporating dish and heated over a steam bath until, on weighing the dish, about 58% of the original solvent had been driven off. The red brown mass was added into a stainless steel vessel containing 4000 ml. of water and 500 ml. of concentrated ammonium hydroxide and stirred mechanically for 4 hours. At intervals the rubbery mass was kneaded, since brown spots in said rubbery mass indicated that not all the brown acid had reacted with ammonia. After stirring for 4 hours the mass was allowed to stand for 24 hours, then washed several times with water and then the excess of water was removed by pressing the rubbery mass between dry toweling. The weight of the resulting product was 1920 grams, said product containing 49% water.

Dried samples of the rubbery mass gave on analysis: Carbon 58.20%; hydrogen 9%; nitrogen 2.86%; chlorine 0.50%; and sulfur 3.58%.

A solution of the polymer was made by dispersing 160 grams of said polymer (containing 49% water) in 200 grams of acetone and 800 grams of toluene and heating under reflux until complete solution was effected. After cooling, 25 ml. of concentrated ammonium hydroxide was added and the dispersion shaken, then allowed to stand.

Two sides of chrome-tanned leather retanned with sulfonyl chloride according to standard procedure were treated with a mixture of commercial fat-liquoring materials so as to deposit 14–16% of oils, then the leathers were dried, milled and staked. One of these sides was then brushed on the grain thereof with a solution of the polymer (diluted to 6% solids) so as to deposit a film of about 5%. The application was made in three coats allowing each coat to dry for 20 minutes in a room well ventilated and heated to 50–60 degrees C. After the third coat the treated side was allowed to stand for 24 hours, then used for tests. The treated leather was non-tacky with a good feel and excellent flexibility.

Both the treated and untreated leathers were subjected to oil penetration tests by cutting samples from various areas (back, neck, shank, belly) and placing the test samples in a flexing machine grain side up with lubricating oil in the trough formed by the test specimen. The samples were flexed 2400 times (30 minutes) and the time taken for the oil to appear on the underside of the test specimen noted. After flexing for 30 minutes the test samples were removed, wiped off from excess of oil and the oil absorbed in the interstices determined by weighing. The test specimens then were extracted with gasoline for 30 minutes and dried for 24 hours, then tested again for oil penetration and absorption. The average for 24 test specimens was as follows: Untreated leather—initial penetration of oil 9 minutes, oil absorption on flexing 30 minutes 52%, relative stiffness factor 0.51. After extraction with gasoline: Initial penetration 5 minutes, oil absorption after flexing 57%, relative stiffness factor 0.74. For similar leather on which a deposition of 5% polymer was deposited as a film on the grain side: Initial penetration, no penetration after 30 minutes of flexing; oil absorption 4.5%; relative stiffness factor 1.3. After gasoline extraction: Initial penetration, none after 30 minutes; oil absorption after 30 minutes of flexing 6.2%; relative stiffness factor 2.1.

These and a large number of other data show that any flexible leather can be rendered oil-repellent by a surface coating of the chlorosulfonated polymers described.

EXAMPLE 7

50 grams of commercial styrene monomer from which the inhibitor was removed was placed in a flask with a thermometer and reflux condenser and heated to the boiling point of the compound (135 degrees C.), then the heat was removed and 0.15 gram of benzoyl peroxide was added over a period of 5 minutes. Then the mixture was heated for another 5 minutes until a temperature of 151 degrees C. was reached. (If the polymerization were carried out until the temperature of 160 to 165 was reached, it was found, based on previous runs, that upon addition of the carbon tetrachloride not all the polymer dissolved, and subsequent addition of chlorosulfonic acid resulted in vigorous substitution reaction as evidenced by copius evolution of hydrogen chloride.)

The solution of the polymerized styrene was cooled to 0 degrees C., 50 cc. of carbon tetrachloride was added, and then treated with 7 grams of chlorosulfonic acid with stirring. A yellow color developed within a few minutes and after 15 minutes there was evidence of evolution of hydrogen chloride. At this point 200 ml. of water and 25 ml. of concentrated aqueous ammonia was added and the mixture was stirred. A white resin precipitated. The resin was filtered and the carbon tetrachloride layer separated and evaporated over a steam bath. About 10 grams of viscous white material was obtained which on standing overnight became gelatinous. The resin powder was not soluble in acetone-toluene while the gelatinous material was. The resin powder gave strong tests for sulfur, a moderate test for nitrogen and a weak test for chlorine; the gelatinous mass gave tests for both sulfur and chlorine and a faint test for nitrogen.

EXAMPLE 8

100 grams of commercial ethyl acrylate monomer from which all inhibitor had been removed was treated in the same manner as the n-butyl methacrylate, in Example 1, with 0.22 gram of benzoyl peroxide added over a period of 10 minutes. The reaction had to be moderated by external cooling. Heating was applied intermittently for an additional 20 minutes after the addition of the benzoyl peroxide, and after a total polymerization time of 30 minutes the mixture was cooled. The relative viscosity prior to dilution with 110 ml. of carbon tetrachloride was found to be 9.8 (compared to pure toluene). The cooled solution was diluted with 100 cc. of carbon tetrachloride, then treated with 13 grams of chlorsulfonic acid and allowed to stand for 4 hours at room temperature. About 60% of the carbon tetrachloride solvent was evaporated under reduced pressure and the mixture treated with 60 ml. of aqueous ammonia and 500 ml. of water and stirred for 3 hours. The resulting white rubbery mass was washed several times with water and, after removing the excess of water with squeezing in a dry towel, it was found to weigh 350 grams. The rubbery mass was soluble in acetone-toluene mixtures and gave a slightly tacky film which had good oil-repellency. The tackiness disappeared after the film was cured for 3 hours at 60–65 degrees C.

What I claim as new and desire to protect by Letters Patent of the United States is:

1. A chlorsulfonated homopolymer having oil-repellent properties, which homopolymer, prior to chlorsulfonation, is liquid at room temperature and is the homopolymer of a monomer selected from the group consisting of acrylic acid, methacrylic acid, alkyl esters of acrylic acid and alkyl esters of methacrylic acid.

2. A chlorsulfonated homopolymer at least partially neutralized with ammonia, said chlorsulfonated homopolymer having oil-repellent properties, which homopolymer, prior to chlorsulfonation, is liquid at room temperature and is the homopolymer of a monomer selected from the group consisting of acrylic acid, methacrylic acid, alkyl esters of acrylic acid and alkyl esters of methacrylic acid.

3. Leather impregnated with a chlorsulfonated homopolymer at least partially neutralized with ammonia, said chlorsulfonated homopolymer having oil-repellent properties, which homopolymer, prior to chlorsulfonation, is liquid at room temperature and is the homopolymer of a monomer selected from the group consisting of acrylic acid, methacrylic acid, alkyl esters of acrylic acid and alkyl esters of methacrylic aid.

References Cited in the file of this patent

UNITED STATES PATENTS 2,809,960    Roth ------------------ Oct. 15, 1957